United States Patent [19]

Heymanns

[11] 4,379,012
[45] Apr. 5, 1983

[54] ADHESIVE TAPE FOR AND METHOD OF JOINING WEBS

[75] Inventor: Willi Heymanns, Kaarst, Fed. Rep. of Germany

[73] Assignee: Jagenberg Werke AG, Dusseldorf, Fed. Rep. of Germany

[21] Appl. No.: 226,587

[22] Filed: Jan. 21, 1981

[30] Foreign Application Priority Data

Jan. 21, 1980 [DE] Fed. Rep. of Germany ....... 3002069

[51] Int. Cl.³ .................. B65H 19/18; B32B 7/06; B32B 7/10; C09J 7/02
[52] U.S. Cl. .................................. 156/157; 156/159; 156/239; 156/249; 156/250; 156/270; 156/344; 156/504; 156/505; 428/40; 428/42; 428/212; 428/354; 428/906; 242/58.1
[58] Field of Search ............... 156/157, 159, 505, 230, 156/249, 344, 269, 250, 239, 270, 258, 504; 242/58.5, 58.1; 428/40, 354, 212, 214, 906; 427/208, 208.4

[56] References Cited

U.S. PATENT DOCUMENTS 4,182,789 1/1980 Castelluzzo ...................... 428/354

*Primary Examiner*—Alexander S. Thomas
*Attorney, Agent, or Firm*—Sprung, Horn, Kramer & Woods

[57] ABSTRACT

There is provided an adhesive tape for the joining of webs, comprising a first tape provided on both its faces with adhesive, second and third cover tapes adhering to the faces of the first tape, and adhesive on the outside of the second cover tape, the adhesive on the outside of the second cover tape being stronger than the adhesive on its inside. The joinder is made by securing the outside face of the second cover tape to a carrier bar, removing the third cover tape, adhering the exposed face of the first tape to the tail end of a first web, removing the second cover tape with carrier bar attached from the first tape which continues to adhere to the web, and then adhering the freshly exposed face of the first tape to the head end of a second web.

3 Claims, 2 Drawing Figures

ADHESIVE TAPE FOR AND METHOD OF JOINING WEBS

BACKGROUND OF THE INVENTION

In the winding up of webs such as paper webs, the tail end of the web has to be affixed to the head end of the next web, and torn webs have to be joined together. This has hitherto been done by affixing a double-faced adhesive tape to the end of one of the webs. However, this manual operation is time-consuming.

SUMMARY OF THE INVENTION

The invention has as its object to provide an adhesive tape which simplifies the joining together of webs.

The adhesive tape in accordance with the invention is characterized by a double-faced adhesive tape to whose outsides peelable cover tapes adhere, one of these cover tapes carrying an adhesive layer on its outside.

Tail end of one web and head of another web are joined together by the use of the adhesive tape in accordance with the invention, which generally comes in the form of a roll, in this way: The adhesive tape is first adhered by the adhesive-coated side of one of the cover tapes to a carrier bar and after removal of the other cover tape is adhered by the exposed adhesive-coated side of the double-faced adhesive tape to the end of one of the webs. Then the other cover tape of the double-faced adhesive tape adhering to the other web is removed and the head end of the other web is adhered to the exposed adhesive-coated side of the double-faced adhesive tape.

The carrier bar can be prepared with the adhesive tape outside the apparatus so that the adhesive tape can be quickly adhered to the end of the web. When the roll in a wind-up stand then is rotated further and the head end of the new web enters the nip between support roll and web roll, the head end of the new web becomes affixed to the tail end of the other web.

As the adhesive tape is being affixed, any objectionable tail of the web can readily be severed along a tear-off edge of the carrier bar, which is constructed accordingly.

BRIEF DESCRIPTION OF THE DRAWING

The invention will now be described in greater detail with reference to an embodiment illustrated in the accompanying drawing, wherein.

DETAILED DESCRIPTION OF THE INVENTION

The adhesive tape comprises a plurality of plies, namely, a middle, double-faced adhesive tape 1 and two cover tapes 2 and 3 which adhere to the adhesive-coated sides of tape 1. Cover tape 2 is provided with an adhesive layer on its outside only while cover tape 3 has no adhesive layer. Cover tape 3 merely serves to separate the individual plies of the adhesive tape, which comes in the form of a roll. The other cover tape, 2, may be a crepe ribbon, for example. The sides of the cover tapes 2 and 3 facing the double-faced adhesive tape, and also the outside of cover tape 3, are such that as the tapes are separated the adhesive layer of the double-faced adhesive tape 1 remains thereon. This property may be imparted to the cover tapes 2 and 3 by providing them with an appropriate adhesive-repellent coating.

Figure 1:
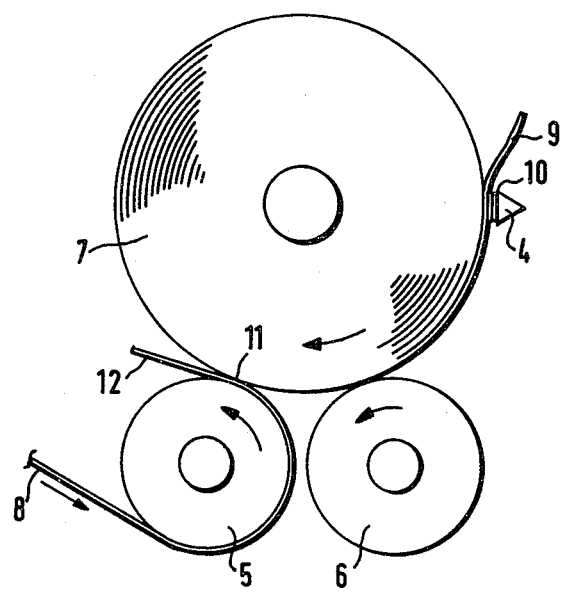
FIG. 1 is a diagrammatic side elevation of a wind-up stand with a web roll.
Figure 2:
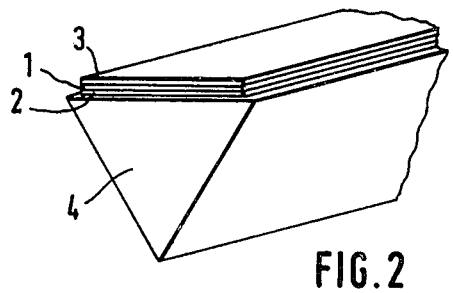
FIG. 2 is an isometric drawing of a carrier bar with an adhesive tape affixed thereto.

Shown in FIG. 1 are two support rolls 5 and 6 and, supported thereon, a web roll 7. The support rolls 5 and 6 and the web roll 7 rotate in the directions indicated. The web 8 to be wound up passes over the support roll 5 to the web roll 7.

In preparation of the affixing of the head end of one web to the tail end of another web, the adhesive tape 1, 2 and 3 is adhered by the adhesive-coated side of the cover tape 2 to the bar 4. Then cover tape 3 is removed and the remainder of the tape, 1 and 2, is adhered along with the carrier bar 4 to the tail end of the web on the web roll 7, as shown in FIG. 1. A loose tail 9 of the web may be severed along a tear-off edge 10 of the carrier bar 4, which is of triangular cross section. The carrier bar 4 along with the cover tape 2 then is removed from adhesive tape 1, which adheres to the web. This of course is feasible only when the adhesive force between web and adhesive tape 1 is greater than that between cover tape 2 and adhesive tape 1 and the adhesive between the bar 4 and the cover tape 2 is stronger than that on both faces of tape 1.

As the roll 7 with its end provided with the adhesive tape 1 continues to rotate and the latter reaches the point 11 where the roll 7 bears on the support roll 5, the adhesive tape 1 affixes the tail end of the web to the head end 12 of the web 8. The overhanging head end 12 then is severed along the adhesive tape 1.

It will be appreciated that the instant specification and claims are set forth by way of illustration and not of limitation, and that various changes and modifications may be made without departing from the spirit and scope of the present invention.

What is claimed is:

1. An adhesive tape for the joining of webs, consisting essentially of a first tape provided on both its faces with adhesive, a second cover tape adhering to one face of the first tape, a third cover tape adhering to the other face of the first tape, and adhesive on the outside of the second cover tape, the adhesive on the outside of the second cover tape being stronger than the adhesive provided on both faces of the first tape.

2. A method of joining webs, as in a wind-up stand for paper webs, by the use of an adhesive tape according to claim 1, comprising securing the outside face of the second cover tape to a carrier bar having a tear-off edge, removing the third cover tape, adhering the exposed face of the first tape to the tail end of a first web, removing the second cover tape with carrier bar attached from the first tape which continues to adhere to the web, and then adhering the freshly exposed face of the first tape to the head end of a second web.

3. The method according to claim 2, wherein before the second cover tape is removed from the first tape the loose tail of the first web is severed along the tear-off edge of the carrier bar.

* * * * *